May 19, 1953  M. M. WILLIAMS  2,639,183
AUTOMOBILE COLLISION GUARD
Filed Aug. 2, 1948
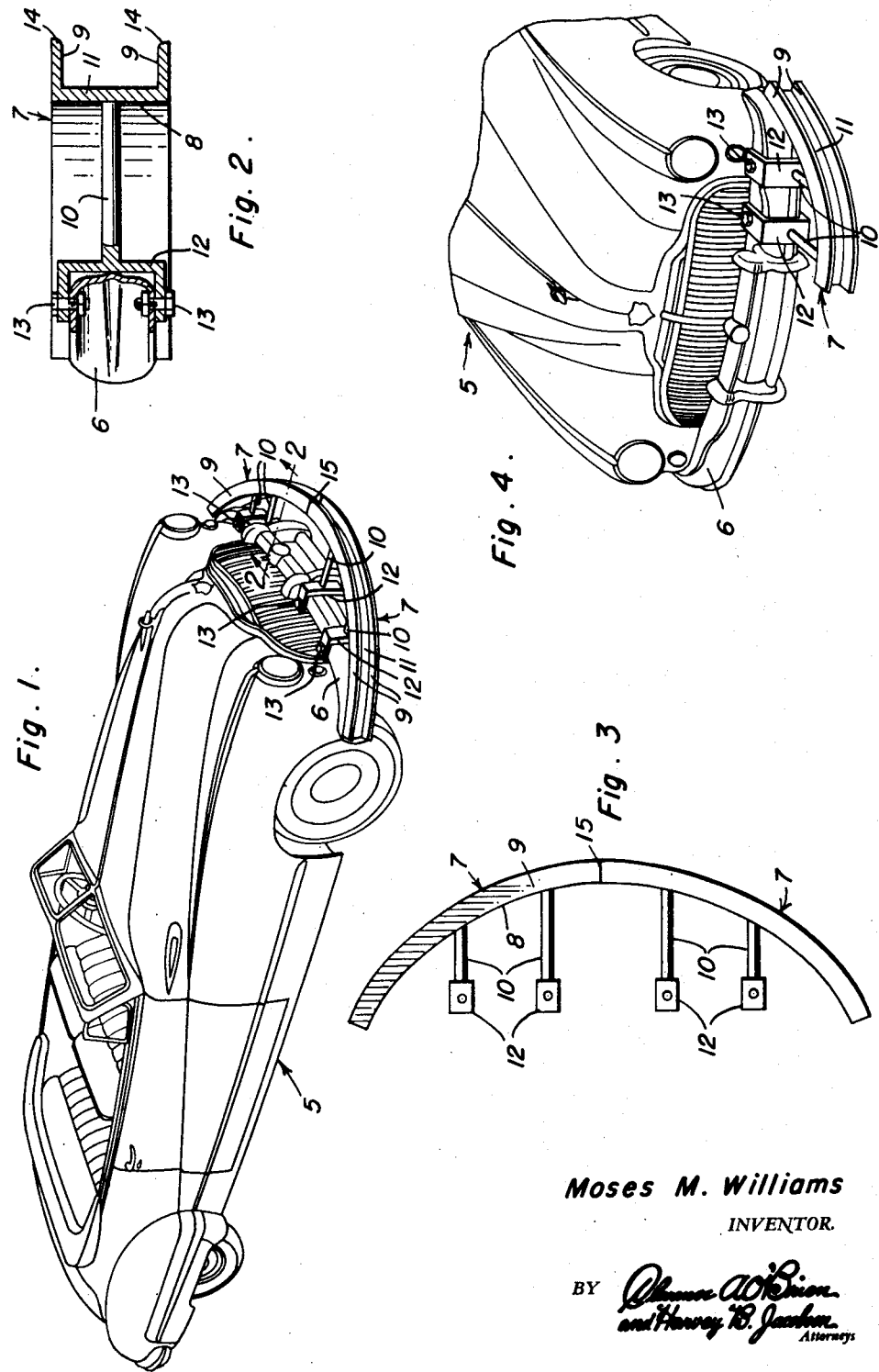
Moses M. Williams
INVENTOR.

Patented May 19, 1953

2,639,183

UNITED STATES PATENT OFFICE 2,639,183

AUTOMOBILE COLLISION GUARD

Moses M. Williams, Miami, Fla., assignor of one-third to Clyde Killens

Application August 2, 1948, Serial No. 41,942

1 Claim. (Cl. 293—75)

This invention relates to a head-on collision guard for automobiles, and has more particular reference to a device adapted for attachment to the front of an automobile to coact with the bumper bar of a colliding vehicle so as to divert the colliding vehicles laterally from each other and thereby minimize the detrimental effects of the collision.

Generally described, the present invention preferably comprises an arcuate channel member having attaching means on the back thereof to rigidly mount the same on an end portion of and in the same horizontal plane as the conventional front transverse bumper bar of an automobile, so that the channel member diverges forwardly from said bumper bar in a direction toward the longitudinal center of the automobile and has its flanges directed forwardly, said channel member being of a size to freely receive the front transverse bumper bar of a colliding vehicle therein for coacting with the latter bar to guide and divert the colliding vehicles laterally from each other. One of the devices may be mounted at the driver's side of the automobile, or one of the same may be mounted at each side of the automobile. In the latter case, the channel members of the two devices may be rigidly connected at their adjacent ends by forming them of one piece or otherwise.

The exact nature of the present invention will become apparent from the description when considered in connection with the accompanying drawings, in which:

Figure 1 is a perspective view of an automobile equipped with a dual guard embodying the present invention;

Figure 2 is an enlarged vertical section taken on a line 2—2 of Figure 1;

Figure 3 is a plan view of the guard shown in Figure 1;

Figure 4 is a view somewhat similar to Figure 1, showing an automobile equipped at the driver's side with a single guard embodying the present invention.

Referring in detail to the drawing, 5 indicates an automobile provided with a conventional front bumper including a transverse bumper bar 6 mounted as usual on the front of the vehicle chassis frame.

The present collision guard includes an arcuate channel member 7, and attaching means on the back 8 of said channel member to rigidly mount the same on an end portion of and in the same horizontal plane as the bumper bar 6 so that said channel member diverges forwardly from said bumper bar in an inward direction or toward the longitudinal center of the automobile and has its flanges 9 directed forwardly. The attaching means preferably consists of a plurality of spaced arms 10 of different lengths rigid with and projecting rearwardly from the intermediate portion 11 of the channel member 7 and having vertical U-shaped brackets 12 rigid with their rear ends, said brackets being disposed in the same transverse vertical plane and being fitted over and bolted at 13 to the bumper bar 6. The channel member 7 is of a size to freely receive the front bumper bar of a colliding vehicle therein for coacting with said front bumper bar to guide and divert the colliding vehicles laterally from each other. Also, the free edges of flanges 9 may be rounded as at 14 or turned to provide a flaring entrance to the space between said flanges and to thereby guide the bumper bar of the colliding vehicle into said space.

It is especially desirable to at least mount a single guard on the end portion of the bumper bar 6 at the driver's side of the automobile, as shown in Figure 4. However, one of the devices may be mounted on each side of the automobile, or on each end portion of the bumper bar 6. In the latter case, the channel members 7 of the two guards may be rigidly connected at their adjacent ends as at 15 in Figures 1 and 3, by forming them of one piece as shown, or otherwise.

When the front of a vehicle, equipped with a single device as shown in Figure 4, collides at its driver's side with the front of another vehicle not so equipped and at the driver's side of the latter vehicle, the bumper bar of said other vehicle will enter the channel member 7 and coact with the latter so as to deflect the vehicles laterally from each other. When the dual guard is used as in Figures 1-3 inclusive, the same result will be had regardless of which sides of the vehicles collide. Due to the reception of the bumper bar of one vehicle within the channel member of the guard installed on the other vehicle, the vehicles will be prevented from up-ending or turning over. By increasing the vertical dimension of the channel member or the space between its flanges, allowance may be made for the mounting of bumper bars on different vehicles at slightly different heights or distances from the ground.

From the foregoing description, it is believed that the construction, operation and advantages of the present invention will be readily understood and appreciated by those skilled in the art.

Modifications and changes in details of construction are contemplated, such as fairly fall within the spirit and scope of the invention as claimed. For instance, the specific attaching means for the arcuate channel member may be varied, and the brackets 12 may be braced with respect to the usual brackets which mount the bumper bar on the vehicle chassis frame.

What is claimed as new is:

The combination of a vehicle bumper with a head-on collision guard for the bumper including a transverse bumper bar, said guard comprising an arcuate forwardly curved channel member, and attaching means on the back of said channel member to rigidly mount the same on an end portion of and in the same horizontal plane as the bumper bar, with the channel member diverging forwardly from said bumper bar in an inward direction and with the flanges of said channel member directed forwardly, the channel of said channel member being empty and of a size to freely receive the bumper bar of a colliding vehicle therein to deflect and guide the latter sidewise, said attaching means comprising a plurality of laterally spaced arms of different lengths rigid with and projecting rearwardly from the intermediate portion of the channel member and having vertical U-shaped brackets rigid with their rear ends, said brackets being disposed in the same transverse vertical plane and adapted to fit over the bumper bar, and means to bolt said brackets to said bumper bar.

MOSES M. WILLIAMS.

References Cited in the file of this patent

UNITED STATES PATENTS

| Number | Name | Date |
|---|---|---|
| 863,124 | Welton | Aug. 13, 1907 |
| 1,325,734 | Lyon | Dec. 23, 1919 |
| 1,406,828 | Dyer | Feb. 14, 1922 |
| 1,598,947 | Ward | Sept. 7, 1926 |
| 1,615,046 | Shaw | Jan. 18, 1927 |
| 1,630,374 | Cox | May 31, 1927 |
| 1,651,079 | Wernig | Nov. 19, 1927 |
| 2,077,110 | Johnson | Apr. 13, 1937 |
| 2,078,679 | Golphin | Apr. 27, 1937 |
| 2,146,642 | Mueth | Feb. 7, 1939 |
| 2,420,894 | Mee | May 20, 1947 |